Figure 3:
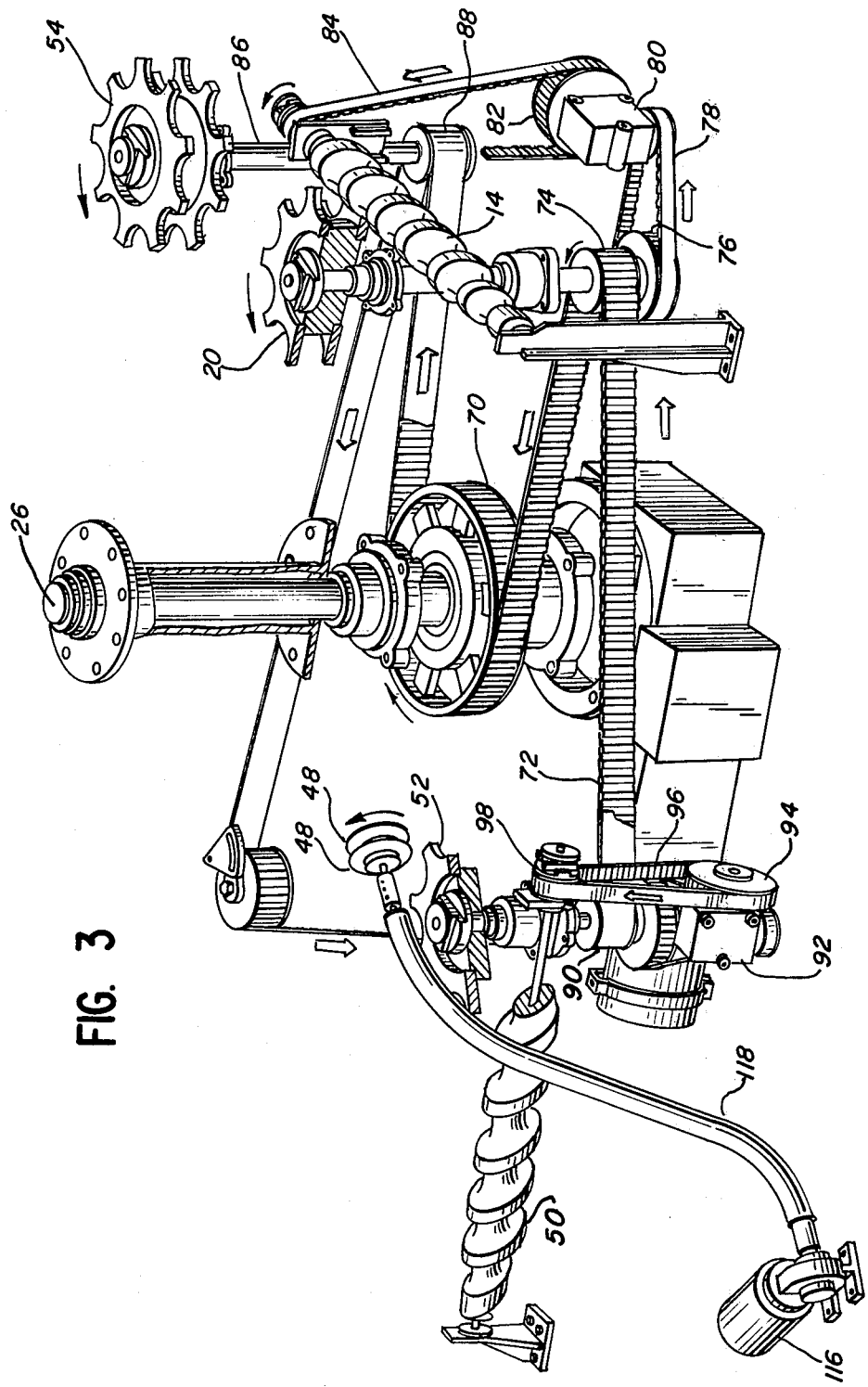

United States Patent [19]

Richardson et al.

[11] 4,441,955
[45] Apr. 10, 1984

[54] BASE CUP APPLICATOR

[75] Inventors: Bryan D. Richardson, Good Hope; Shelton E. Lewis, Norcross, both of Ga.

[73] Assignee: Standard Oil Company (Indiana), Chicago, Ill.

[21] Appl. No.: 405,554

[22] Filed: Aug. 5, 1982

[51] Int. Cl.³ ............................................. B29D 3/00
[52] U.S. Cl. .................... 156/423; 29/773; 29/786; 29/792; 118/258; 156/294; 156/557; 156/567; 156/578; 198/477; 198/651
[58] Field of Search ............... 156/292, 294, 293, 423, 156/556, 557, 566, 567, 578; 118/258, 234, 244; 29/773, 786, 792; 198/977, 479, 651

[56] References Cited

U.S. PATENT DOCUMENTS

| | | | |
|---|---|---|---|
| 1,415,563 | 5/1922 | Hoffman | 118/258 |
| 2,241,664 | 5/1941 | Heckman | 118/258 |
| 2,360,582 | 10/1944 | Richardson | 118/258 |
| 2,539,988 | 1/1951 | Calles et al. | 118/244 |
| 3,220,908 | 11/1965 | Brown et al. | 156/293 |
| 3,552,354 | 1/1971 | Kershaw | 118/234 |
| 3,952,898 | 4/1976 | Bayer | 156/293 |
| 3,955,496 | 5/1976 | Urban | 198/651 |
| 3,976,187 | 8/1976 | Szpitalek | 198/651 |
| 4,096,620 | 6/1978 | Kontz | 29/786 |
| 4,225,375 | 9/1980 | Aidlin et al. | 156/293 |
| 4,305,772 | 12/1981 | Valyi | 156/294 |

Primary Examiner—Jerome W. Massie
Attorney, Agent, or Firm—Robert R. Cochran; William T. McClain; William H. Magidson

[57] ABSTRACT

A method and apparatus for the continuous application of base cups to rounded bottom bottles including continuous feed of bottle and base cups and continuous removal of completed bottles. Further, a novel system is shown for applying glue or adhesive to the bottoms of the bottles for application of the base cup thereto.

2 Claims, 11 Drawing Figures

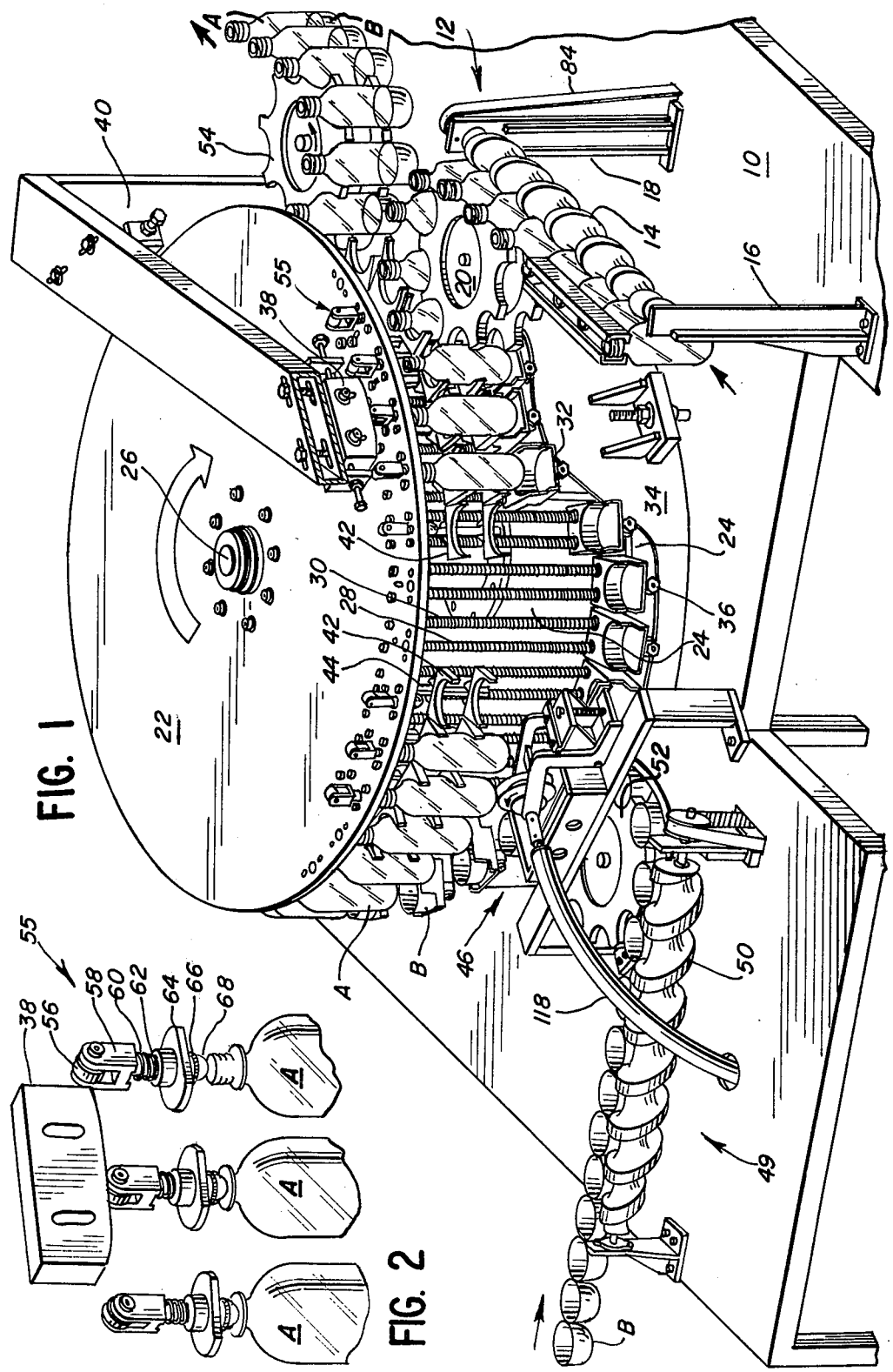

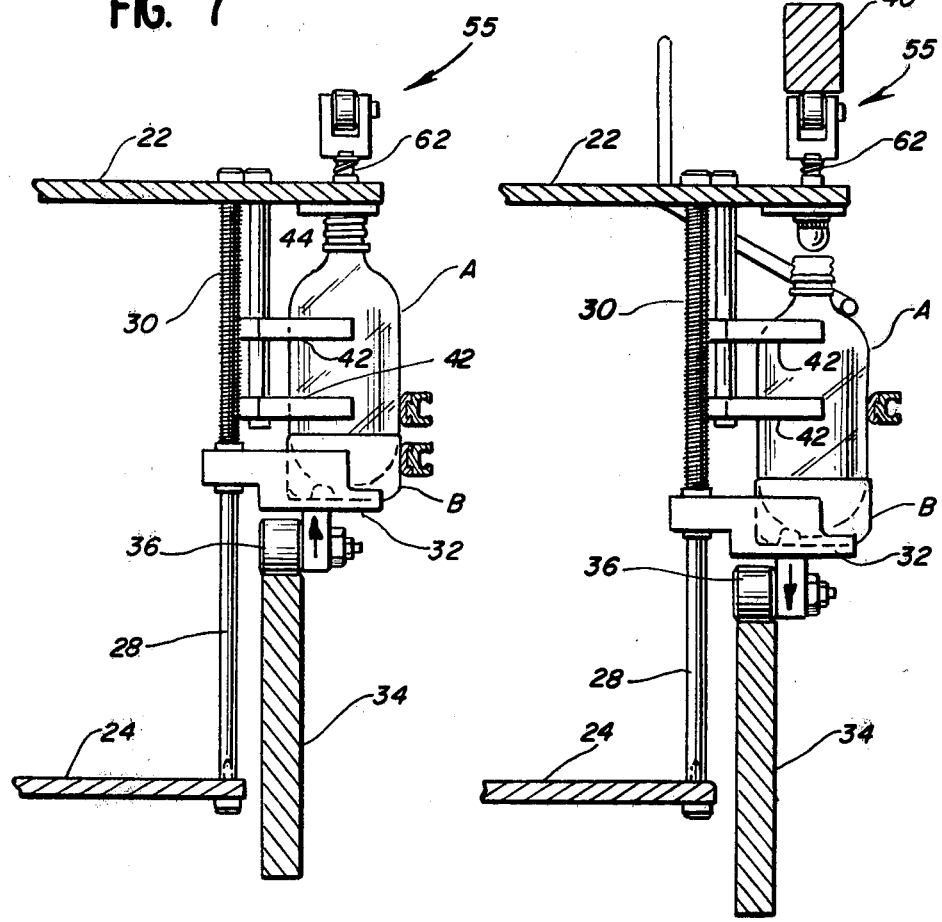

BASE CUP APPLICATOR

This invention relates to a method and apparatus for applying base cups to plastic bottles. Such bottles are normally blow molded and have a generally rounded bottom. Base cups are applied to the bottoms of the bottles so they will stand in an upright position.

A number of prior art systems are known for the application of base cups to bottles but these operate by applying the adhesive to the base cup in a stopped position which is subsequently forced onto the bottle or the bottle is pushed into the base cup. This intermittent operation slows down the operation of the machine.

One system in use is of the type disclosed in Aidlin et al. U.S. Pat. No. 4,132,584 (1979) wherein a rotary table is used. Provided the blow molding system is working properly the turntable may operate continuously but the base cups are supplied intermittently i e. they are stopped in their path while glue is applied to the base cups.

Another system is shown in Kontz U.S. Pat. No. 4,247,357 (1981) which shows a continuously rotating table with intermittent feed of base cups.

Young U.S. Pat. No. 4,312,439 (1982) shows the assembly of bottles and base cups by supplying a glue-containing base cup to a shoe which, upon upward movement attaches the base cup to the bottle. Once again the main conveyor and the base cups move in an intermittent or step-by-step manner.

Apparatus for applying adhesive to necks of bottles is also known. One such example being Amberg U.S. Pat. No. 4,102,302 (1978). This patent shows spot application of an adhesive prior to application of a shrink label. A first beveled wheel rotates in an adhesive supply tank this applying adhesive to a second rotating flexible wheel which makes spot contact with bottles passing in a straight line thereby.

Roller coating apparatus is also shown in Bergstein U.S. Pat. No. 2,632,918 (1953). Rollers in this patent apply a thermoplastic material to exposed end and edge portions of a rectangular package for sealing the same.

The principal object of the present invention is to provide a continuously operating base cup applicator machine wherein bottles and base cups are continuously fed thereto, and the base cups and bottles are united in a continuous operation.

A further object of this invention is to provide a base cup applicator using a new and improved adhesive or glue supply system for applying strips of adhesive to the base of the bottle.

Other advantages of the present system will become apparent to those skilled in the art by reading the accompanying specification.

In one aspect our invention comprises apparatus for applying base cups to the bottoms of rounded bottom containers comprising:

(1) upper and lower circular driven support plates,
(2) U-shaped bottle holders mounted below said upper support plate,
(3) a plurality of internal gripper assemblies including an upwardly biased internal gripper mounted on said upper support plate,
(4) vertical support means extending between said support plates
(5) a first cam surrounding said lower support plate,
(6) vertically movable shoes mounted on said support means adapted to be driven vertically by said cam,
(7) bottle supply means adapted to supply bottles to said machine at a first position,
(8) a second cam mounted above said upper circular support plate at a location downstream of said first position adapted to depress an internal gripper into the neck of a container,
(9) a first portion of said first cam aligned with said second cam adapted to raise a shoe, thereby pushing a container upwardly onto a depressed internal gripper at a second location,
(10) a second portion of said first cam being adapted to permit movement of said shoes to a lowermost position,
(11) means to supply base cups to said shoes in said lowermost position,
(12) means to apply an adhesive to the bottoms of said containers at a third position,
(13) a third portion of said first cam downstream of said third position adapted to raise said shoes to a position where a base cup is pressed onto the bottom of a container in a fourth position,
(14) a third cam mounted above said upper transport member adapted to release a bottle from an internal gripper at a fifth position, and
(15) bottle removal means at a sixth position.

The means to apply an adhesive constitutes another aspect of the invention, this being a glue applicator assembly comprising:

(1) a glue tank,
(2) a pivoted arm having first and second ends mounted adjacent said tank,
  (i) said first end extending over said tank, and
  (ii) said second end extending outside of said tank,
(3) at least one rotatable wheel mounted on said first end so positioned as to have the lower portion extending into said tank and the upper portion extending above said first end, and
(4) flexible biasing means to bias said first end toward an upward position.

A feature of this glue applicator includes means to adjust the limiting upward movement of said first end. Normally, two rotatable wheels are mounted on the first end of said arm.

A further feature of the glue applicator includes means to maintain a constant level of adhesive in the cavity over which said rotatable wheels are mounted. This includes first and second cavities, and a partition between the cavities so constructed as to permit overflow from said first cavity to said second cavity as the adhesive is continuously supplied to said first cavity in an amount greater than that picked up by said rotatable wheels.

Another aspect of the invention resides in the method of applying base cups to bottles having rounded bases and narrow neck portions comprising:

(1) continuously feeding bottles to a continuously rotating circular system,
(2) engaging each bottle by moving the bottle upwardly onto a gripper,
(3) applying adhesive in at least one longitudinal strip to a portion of the rounded base of each bottle,
(4) continuously feeding base cups to said continuously rotating system,
(5) pressing each base cup into contact with the base of a bottle,
(6) disengaging each bottle from the gripper, and
(7) continuously removing bottles from said rotating circular system.

Figure 4:
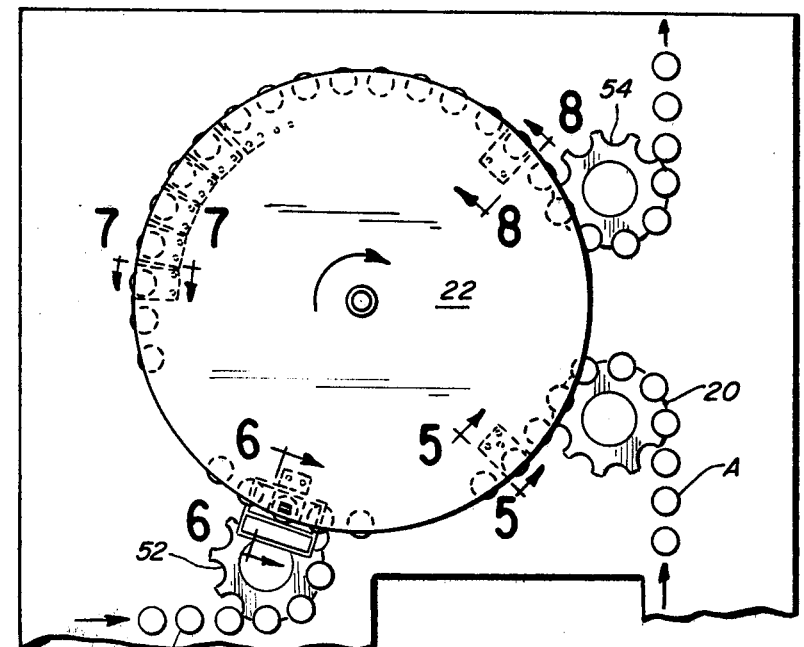
Figures 5, 6:
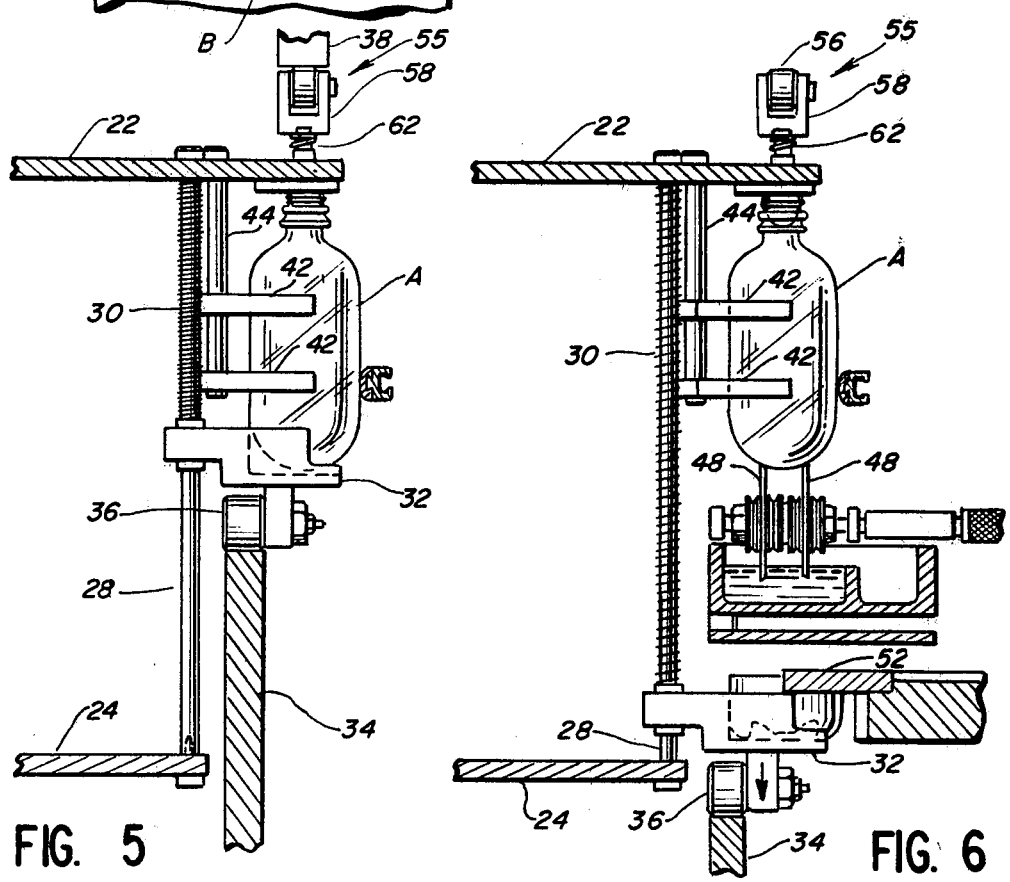
Figure 9:
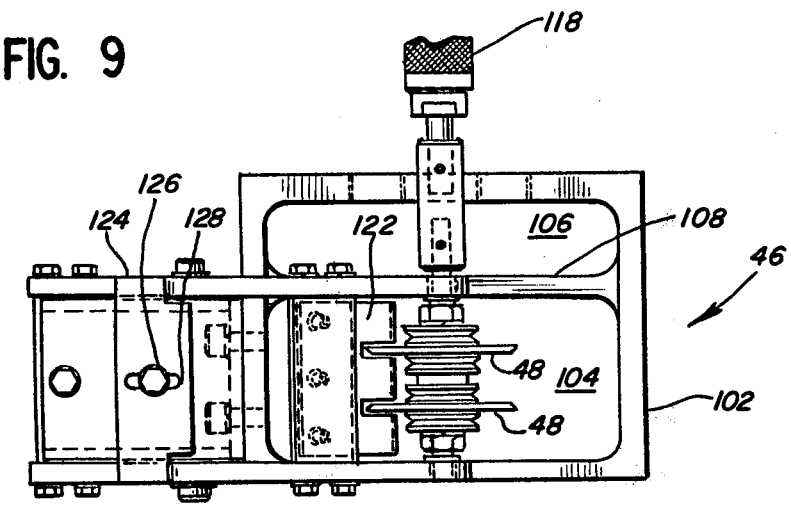
Figure 10:
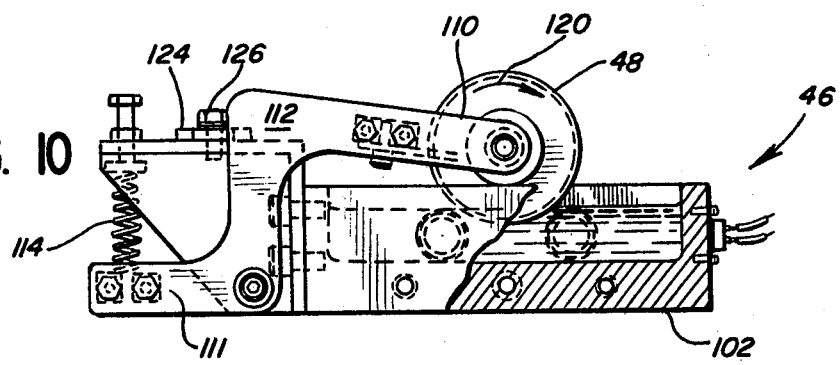
Figure 11:
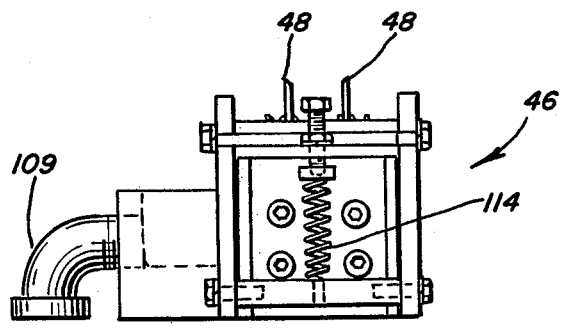

Accompanying and forming a part of the specification is a drawing comprising:

FIG. 1, a perspective view of the base cup applicator of the invention,

FIG. 2, an enlarged detailed perspective view of an internal gripper assembly for use in the apparatus, FIG. 3, a perspective view of the drive assembly used in the apparatus, FIG. 4, a top view of the machine showing the sequence of operation in the base cup applicator, FIG. 5, an enlarged cross-section view on line 5—5 of FIG. 4 showing the gripping step, FIG. 6, an enlarged view of line 6—6 of FIG. 4 showing the glue application step, FIG. 7, an enlarged view of line 7—7 of FIG. 4 showing the bottle and base cup joined, FIG. 8, a view of line 8—8 of FIG. 4 showing the bottle release step, FIG. 9, a top plane view of the glue wheel applicator assembly, FIG. 10, side view of the glue applicator assembly, and FIG. 11, an end view of the glue applicator assembly.

In view of the relatively complex nature of the apparatus and the fact that FIG. 1 shows a great deal of detail, it will be necessary to consider several figures together where common numerals are used throughout. In all figures, the bottles are designated "A" and base cups, "B".

The complete system is mounted upon a support table 10 of appropriate size and construction. The bottle feed system 12 includes plastic timing screw 14 mounted on support members 16 and 18, and a plastic star wheel 20 for guiding the bottle into a central carrousel having an upper support plate 22 and a lower support plate 24. Plates 22 and 24 are joined together and rotate upon a shaft 26 as will be more fully apparent from FIG. 3. Mounted between upper plate 22 and lower plate 24 of the carrousel around the periphery thereof are a series of parallel shafts 28 having compression springs 30 positioned thereon. Mounted on each pair of shafts is a shoe 32.

Surrounding lower plate 24 of the carrousel is a circular cam 34. Shoes 32 supported on shafts 28 travel on cam 34 by means of cam rollers 36. Two upper cams, first upper cam system 38 and second upper cam system 40, are provided. Cam 38 operates to engage the bottle by the internal gripper assembly (FIG. 2) as will be later described and cam system 40, is the bottle release cam to be more fully described in connection with FIG. 8. Bottles are held in a vertical direction by means of a plurality of bottle guides 42 located on shafts 44 which extend downwardly from upper support plate 22. In a portion of cam 34 downstream of the gripper assembly, there is a low portion of this cam 34 so that shoes 32 are at a lower point than glue applicator assembly 46. The bottoms of the bottles positioned over glue applicator assembly 46 contact wheels 48 (see FIG. 6 and FIGS. 9–11) for adhesive application. Directly below the glue applicator assembly, base cups B are supplied to shoes 32 by base cup feed system 49 comprising timing screw 50 and star wheel 52. A support bar (not shown) extends along the far side of the base cups in FIG. 1 to maintain them in contact with timing screw 50.

Subsequent to the point of supply of base cups to shoes 32, cam 34 increases in height to a point where base cups are placed onto the bottoms of the bottles. (See FIG. 7.) Bottles are released from the carrousel.

The bottles are released at a release stop under cam 40. (See FIG. 8.) Upon release from the bottle gripper assembly 55 (see FIG. 2) they enter star wheel 54 and are transported to a packaging system (not shown).

Now directing specific attention to subsequent figures, further details of the apparatus will become apparent. Considering FIG. 2, the internal bottle gripper assembly 55 is shown in detail. The principal elements of the internal gripper assembly 55 include cam roller 56, cam roller yoke 58, square shaft 60, compression spring 62, stationary guide 64, garter spring 66, and gripper nose 68.

FIG. 3 illustrates the drive assembly for the apparatus, and further, obviously, provides a system wherein all of the bottle and base cup movements occur simultaneously in view of the single drive for all elements. A single gear 70 powered by a motor (not shown) drives timing belt 72. Such belts are available from Browning Manufacturing Company and are rubber with glass fibers therein for strength and durability.

Belt 72, driven by gear 70, drives timing screw 14 by means of gears 74, 76, belt 78, gear box 80, gear 82, and belt 84. Gear 74 also drives star wheel 20. Star wheel 54 is driven on shaft 86 by belt 72 passing over gear 88. Timing screw 50, driven by belt 72, passes over gear 90, gear box 92, gear 94, belt 96, and gear 98. Gear 90 also drives star wheel 52.

Directing attention to FIGS. 2 and 4–8, the operation of this system can be understood. FIG. 2 shows the internal gripper assembly 55. As the internal bottle gripper 55 approaches the first upper cam 38, the cam roller 56 makes contact with the inclined surface on this cam. As the cam roller 56 continues downward along its path of travel it is forced downward along the lower surface of cam 38. The downward motion of cam roller 56 also forces cam roller yoke 58, square shaft 60 and gripper nose 68 to move downward. Between gripper nose 68 and stationary guide 64, the mating surfaces are chamfered to form a "V" groove. In this groove, a garter spring 66 is positioned. As the gripper nose 68 is forced downward and away from stationary guide 64, the "V" groove becomes wider and the garter spring 66 retracts. This allows the bottle A to be pushed onto the gripper nose 68, garter spring 66 and the small lower cylindrical portion of stationary guide 64. This is also shown in FIG. 5 where shoe 32 is at its utmost upper position to support the bottle A and position it into position in contact with gripper 55.

While the shoe 32 holds bottle A in its highest elevated position, the cam roller 56 travels beyond the end of cam 38, which allows cam roller 56 and cam roller yoke 58 to be pushed upward by compression spring 62. By cam roller yoke 58 being attached to square shaft 60 and gripper nose 68, this upward movement narrows the space in the "V" groove. As the space in the "V" groove becomes smaller, the garter spring 66 is caused to expand. As the spring expands, it grips the inside of the bottle.

Continued rotation of the carrousel carries bottle A across the rotating glue wheels 48 where two strips of glue are applied to the base of the bottle A as is best seen in FIG. 6. (The glue wheel assembly 46 will be described hereinafter.) Positioned below the glue wheel assembly 46 is the base cup feed system 49, which supplies base cups B to the shoe 32 in the lower-most position.

Thereafter, as shown in FIG. 7 the shoe 32 is driven upwardly on cam 34 to make firm contact between bottle A and base cup B.

After assembly, the bottle A with the base cup B is released from the internal bottle gripper assembly 55 by means of a second cam 40, the release procedure being the reverse of the attachment procedure, this being shown in FIG. 8. It will be noted that shoe 32 drops slightly to permit bottle release from the gripper assembly 55.

Now directing attention to FIGS. 9–11, the components of the glue applicator assembly 46 and their operation will be described. This assembly consists of a glue tank 102 which acts as a reservoir for the hot melt glue or adhesive. The glue tank 102 is provided with a first cavity 104 and a second cavity 106 with partition 108 separating the two. This partition 108 is of a shorter height than the outside walls and is so designed to maintain a constant depth of glue to make contact with glue wheels 48. A heater (not shown) maintains the glue at the proper temperatures.

The glue is initially melted in an external glue tank (not shown) and then transferred by pump to glue tank 102. The glue is fed to cavity 104 with the excess glue overflowing to cavity 106. Cavity 106 collects the excess glue and funnels it into return pipe 109 for return to the external melting tank.

The glue wheels 48 are supported by first end 110 of a pivoting arm assembly 112. The opposite end 111 of the pivoting arm assembly 112 is held in a downward position by compression spring 114. This maintains glue wheels 48 in an up position. Glue wheels 48 are rotated by an adjustable speed gear motor 116 (shown in FIG. 3) through a flexible shaft 118 in the direction shown by the arrow 120 in FIG. 10. This is the same direction as the bottles A are moving.

Rotation of glue wheels 48 submerges the lower edges in the hot melt glue thereby allowing a layer of glue to be attached to the outer surface of these wheels. The amount of glue on the surface of glue wheels 48 is controlled by doctor blade 122.

In operation, the bottom of a suspended bottle A extends slightly lower than the top surface of glue wheels 48. As the bottle A approaches and passes over the glue wheels 48, the glue wheels 48 make contact with the bottom of the bottle and are forced downward under the bottle A, and then returns to an up position after passage of the bottle A. The length of the glue strip thus applied can be varied by moving pivoting arm stop 124 to the left or right (shown in FIGS. 9 and 10). The position is maintained by means of bolt 126 extending through slot 128 in pivoting arm stop 124. Specifically, movement of pivot arm stop 124 to the right will lower the up position of glue wheels 48 and reduce the length of contact with the bottom of the bottle A. Conversely, movement to the left in FIG. 9 will raise the relative position of glue wheels 48 and increase the length of contact with the bottom of the bottle A.

Returning to FIG. 1, the overall operation can be seen. For an understanding of the particular operations, consideration should also be made to FIGS. 2 and 4–8. From a source of bottles A (not shown), an air conveying system supplies the bottles A to timing screw 14 and into star wheel 20. The bottles A pass from star wheel 20 to the carrousel and are picked up by the internal gripping assembly 55 by upward movement of shoe 32 pushes the bottle A upwardly onto the gripper nose 68. Thereafter, the shoes 32 ride downwardly away from the bottles A to the glue applicator area where base cups B, supplied from an unscrambler (not shown), are fed by timing screw 50 and star wheel 52 into shoes 32 at approximately the same time glue is applied to the bottoms of the bottles A. Thereafter, cam 34 forces the base cup B upwardly into contact with the bottles A. This glue sets during the movement of the bottles A around the balance of the carrousel to the release position wherein cam 40 separates the internal gripper assembly 55 to remove the gripper nose 68 from the bottle A. The cam 34 lowers the position of the shoe 32 at this release position. Thereafter, the bottles A exit by means of star wheel 54 and pass to a packaging system (not shown).

The system shown in the drawings was designed for the assembly of half-liter bottles and base cups. In this embodiment 36 bottle positions are provided around the carrousel. This, of course, can be varied depending upon the diameter of support plates 22 and 24. The system would work equally well with 1 or 2-liter bottles although fewer positions on the carrousel would be possible in view of the larger size of the bottles.

The advantage of our system resides in the higher speeds obtainable as a result of the continuous motion of all components. This machine will operate up to speeds four times higher than machines currently available which stop the base cups for application of the glue thereon. Speeds of over 400 bottles per minute can be obtained with this system.

A specific embodiment of this invention has been described but it will be obvious to those skilled in the art that considerable variation can be made without departing from the broad scope of the invention.

We claim:

1. Apparatus for applying base cups to the bottoms of rounded bottom containers comprising:
    (1) upper and lower circular driven support plates,
    (2) U-shaped bottle holders mounted below said upper support plate,
    (3) a plurality of internal gripper assemblies including an upwardly biased internal gripper mounted on said upper support plate,
    (4) vertical support means extending between said support plates,
    (5) a first cam surrounding said lower support plate,
    (6) vertically movable shoes mounted on said support means adapted to be driven vertically by said cam,
    (7) bottle supply means adapted to supply bottles to said machine at a first position,
    (8) a second cam mounted above said upper circular support plate at a location downstream of said first position adapted to depress an internal gripper into the neck of a container,
    (9) a first portion of said first cam aligned with said second cam adapted to raise a shoe thereby pushing a container upwardly onto a depressed internal gripper at a second location,
    (10) a second portion of said first cam being adapted to permit movement of said shoes to a lowermost position,
    (11) means to supply base cups to said shoes in said lowermost position,
    (12) means to apply an adhesive to the bottoms of said containers at a third position,
    (13) a third portion of said first cam downstream of said third position adapted to raise said shoes to a position where a base cup is pressed onto the bottom of a container in a fourth position,

(14) a third cam mounted above said upper transport member adapted to release a bottle from an internal gripper at a fifth position, and

(15) bottle removal means at a sixth position.

2. The apparatus of claim 1 wherein said means to apply an adhesive, to the bottoms of said containers comprises a glue applicator comprising:

(1) a glue tank, (2) a pivoted arm having first and second ends mounted adjacent to said tank,
  (i) said first end extending over said tank, and
  (ii) said second end extending outside of said tank, (3) at least one rotatable wheel mounted on said first end so positioned as to have the lower portion extending into said tank and the upper portion extending above said first end, and (4) flexible biasing means to bias said first end toward an upper position.

* * * * *